(12) United States Patent
Bender et al.

(10) Patent No.: US 10,977,353 B2
(45) Date of Patent: Apr. 13, 2021

(54) VALIDATING AUTHORIZED ACTIVITIES APPROVED BY A GUARDIAN

(71) Applicant: INTERNATIONAL BUSINESS MACHINES CORPORATION, Armonk, NY (US)

(72) Inventors: Michael Bender, Rye Brook, NY (US); Rhonda L. Childress, Austin, TX (US); Todd R. Palmer, Danbury, CT (US); Manjari Roy, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 16/133,928

(22) Filed: Sep. 18, 2018

(65) Prior Publication Data

US 2020/0089853 A1    Mar. 19, 2020

(51) Int. Cl.
| | |
|---|---|
| G06F 21/00 | (2013.01) |
| G06F 7/04 | (2006.01) |
| H04L 9/32 | (2006.01) |
| G06F 21/32 | (2013.01) |

(52) U.S. Cl.
CPC ...... *G06F 21/32* (2013.01); *G06F 2221/2115* (2013.01)

(58) Field of Classification Search
CPC .......... G06F 21/32; G06F 21/00; G06F 21/31; H04L 29/06
USPC .......................................................... 726/21
See application file for complete search history.

(56) References Cited

U.S. PATENT DOCUMENTS

| | | | |
|---|---|---|---|
| 8,312,526 B2* | 11/2012 | Karabulut | H04L 9/3265 713/156 |
| 9,769,141 B2 | 9/2017 | Brannon | |
| 2003/0088434 A1 | 5/2003 | Blechman | |
| 2007/0078908 A1 | 4/2007 | Rohatgi et al. | |
| 2007/0079369 A1* | 4/2007 | Grinstein | G06F 21/629 726/19 |
| 2008/0140569 A1 | 6/2008 | Handel | |

(Continued)

FOREIGN PATENT DOCUMENTS

WO    03073200    9/2003

OTHER PUBLICATIONS

Riva et al., "The Personal Internetworked Notary and Guardian", International Journal of Medical Informatics 62 (2001) 27-40, 2001, 14 pages.

*Primary Examiner* — Haresh N Patel
(74) *Attorney, Agent, or Firm* — Brian Restauro; Andrew D. Wright; Roberts Calderon Safran & Cole, P.C.

(57) ABSTRACT

A computer-implemented method includes: receiving, by a computer device, biometric data scanned from a guardian and biometric data scanned from a ward; receiving, by the computer device, data defining a relationship between the guardian and the ward; storing, by the computer device, the biometric data scanned from the guardian, the biometric data scanned from the ward, and the data defining the relationship in a record in a secure database; receiving, by the computer device, a request for validation including scanned biometric data; determining, by the computer device, the scanned biometric data matches the record in the secure database; and transmitting, by the computer device and in response to the determining, data defining an authorization based on the relationship.

19 Claims, 6 Drawing Sheets

(56) References Cited

U.S. PATENT DOCUMENTS

| | | | |
|---|---|---|---|
| 2009/0307755 A1 | 12/2009 | Dvorak et al. | |
| 2010/0097174 A1* | 4/2010 | Marmigere | G07C 9/257 340/5.7 |
| 2014/0282961 A1* | 9/2014 | Dorfman | G06F 21/35 726/7 |
| 2015/0007295 A1* | 1/2015 | Hou | G06K 9/00926 726/7 |
| 2015/0321641 A1* | 11/2015 | Abou Mahmoud | B60R 25/00 701/2 |
| 2016/0182508 A1 | 6/2016 | Gresham et al. | |
| 2016/0191243 A1* | 6/2016 | Manning | H04L 9/321 713/168 |
| 2016/0330078 A1 | 11/2016 | Bostick et al. | |
| 2017/0083867 A1* | 3/2017 | Saxena | G06Q 10/103 |
| 2017/0094049 A1* | 3/2017 | Kanevsky | H04M 1/72577 |
| 2017/0301052 A1 | 10/2017 | Abt et al. | |
| 2018/0041503 A1* | 2/2018 | Lindemann | H04L 63/0435 |
| 2018/0183602 A1* | 6/2018 | Campagna | H04L 9/0861 |
| 2019/0066045 A1* | 2/2019 | Cantrell | G06Q 10/0834 |
| 2019/0164156 A1* | 5/2019 | Lindemann | H04L 9/0825 |
| 2019/0188364 A1* | 6/2019 | Wang | G06F 3/0414 |

\* cited by examiner

VALIDATING AUTHORIZED ACTIVITIES APPROVED BY A GUARDIAN

BACKGROUND

The present invention relates generally to computer systems and, more particularly, to biometric based database systems for validating authorized activities approved by a guardian.

A legal guardian is a person who has the legal authority to care for the personal and property interests of another person, commonly referred to as a ward. Guardians are typically used in situations including guardianship for an incapacitated senior (e.g., due to old age or infirmity) and guardianship for a minor.

SUMMARY

In a first aspect of the invention, there is a computer-implemented method including: receiving, by a computer device, biometric data scanned from a guardian and biometric data scanned from a ward; receiving, by the computer device, data defining a relationship between the guardian and the ward; storing, by the computer device, the biometric data scanned from the guardian, the biometric data scanned from the ward, and the data defining the relationship in a record in a secure database; receiving, by the computer device, a request for validation including scanned biometric data; determining, by the computer device, the scanned biometric data matches the record in the secure database; and transmitting, by the computer device and in response to the determining, data defining an authorization based on the relationship.

In another aspect of the invention, there is a computer program product including a computer readable storage medium having program instructions embodied therewith. The program instructions are executable by a computing device to cause the computing device to: receive biometric data scanned from a guardian and biometric data scanned from a ward; receive data defining a relationship between the guardian and the ward; store the biometric data scanned from the guardian, the biometric data scanned from the ward, and the data defining the relationship in a record in a secure database; receive a request for validation including scanned biometric data; determine the scanned biometric data matches the record in the secure database; and transmit data defining an authorization based on the relationship.

In another aspect of the invention, there is system including a processor, a computer readable memory, and a computer readable storage medium. The system includes: program instructions to receive, from a trusted entity device, biometric data scanned from a guardian and biometric data scanned from a ward; program instructions to receive, from the trusted entity device, data defining a relationship between the guardian and the ward; program instructions to store the biometric data scanned from the guardian, the biometric data scanned from the ward, and the data defining the relationship in a record in a first secure database; program instructions to receive, from a computer device other than the trusted entity device, a delegation of authority associated with the relationship between the guardian and the ward; program instructions to store data defining the delegation of authority in record in a second secure database linked to the record in the first secure database; program instructions to receive, from a validation device, a request for validation including scanned biometric data; program instructions to determine the scanned biometric data matches the record in the first secure database; and program instructions to transmit, to the validation device and in response to the determining, data defining the delegation of authority associated with the relationship. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
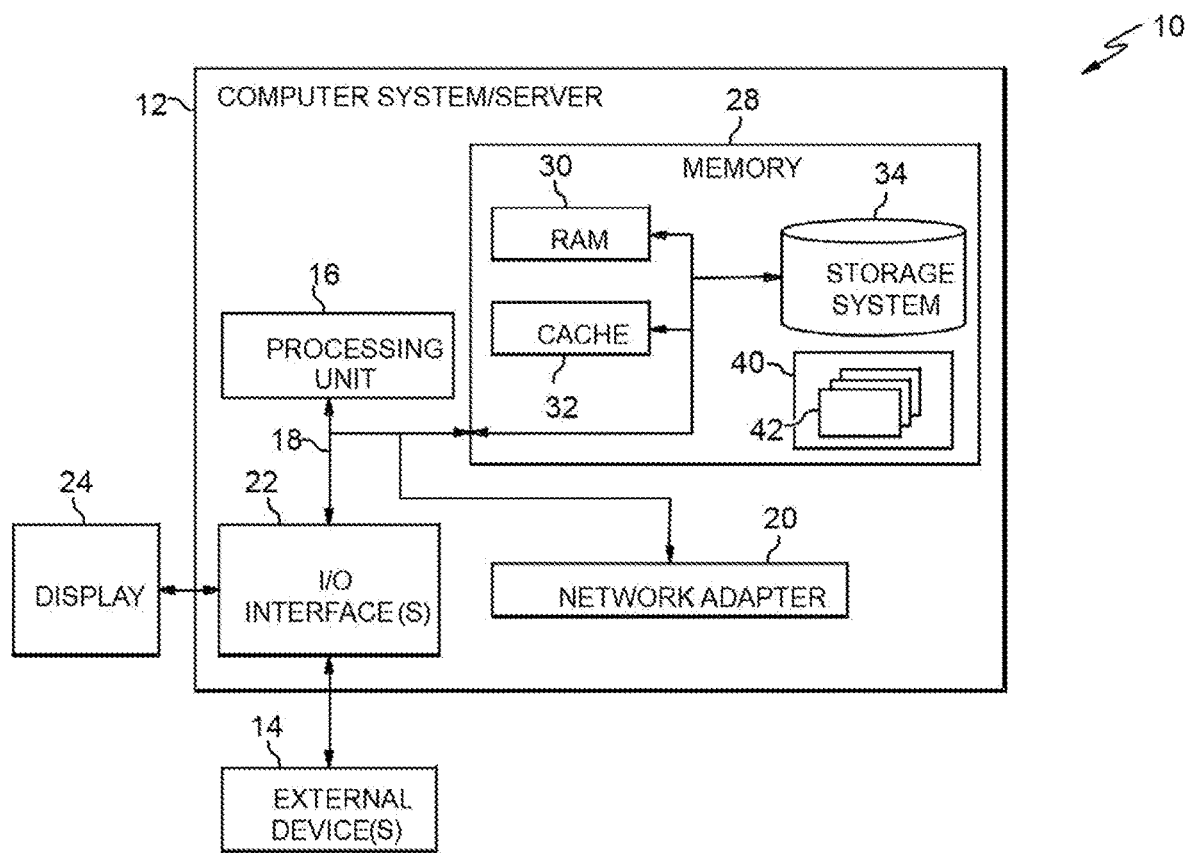
FIG. 1 depicts a computer infrastructure according to an embodiment of the present invention.

The present invention relates generally to computer systems and, more particularly, to biometric based database systems for validating authorized activities approved by a guardian. When a guardian wants to take an action or delegate an action regarding a ward, the guardian typically must possess and present paperwork to prove their status as a legal guardian of the ward, e.g., that they have the authority to allow the action to take place. Common types of actions that require proof of guardianship include traveling internationally with a minor, making medical decisions for a ward, etc. A problem arises in that it is difficult and time consuming to obtain, keep, and present the necessary paperwork, which may include documents such as birth certificates, court orders, written consent from another parent, etc. Another problem arises in that there is often a lack of consistency in what paperwork is required. For example, when traveling internationally with a minor, different international travel control points (e.g., in different countries) might require different documents to prove legal guardianship, leaving a guardian traveling with the minor guessing as to which documents are necessary for accessing a given international travel control point. An even further problem arises in that there is often uncertainty even when documents are presented. For example, even when the required paperwork is provided, there is sometimes uncertainty that the person for whom the decision is being made (e.g., a minor travelling with an adult at a border control point) is the person referenced in the paperwork. Aspects of the invention address this problem by providing biometric based database systems for validating authorized activities approved by a guardian.

According to aspects of the invention, a computer system stores data defining a relationship between individuals (e.g., a guardian and ward relationship) and data defining a biometric identifier of each of the individuals. In embodiments, the system stores data defining authorizations related to the individuals, e.g., activities that one of the individuals is authorized to perform with or on behalf of another one of the individuals. In embodiments, the system provides a user interface by which an end-user may scan biometric data of individuals and, in response to the scanning, receive an indication of an authorized activity for these individuals. In this manner, implementations of the invention provide the ability to validate authorized activities approved by a guardian based on scanning biometric data of individuals.

In aspects, some of the data stored and used by the system can only be entered into the system by a trusted entity. For example, in embodiments, the system is configured such that baseline biometric data for a guardian and a ward, and data defining the legal relationship between the guardian and ward, can only be entered by a trusted entity. However, once the relationship is defined in the system, some implementations permit the guardian to delegate approval for certain activities to another person.

In this manner, implementations of the invention provide a system and method to define temporary or permanent legal guardianship, or authorization to make a legal decision to an individual for all, or a subset, of pre-defined activities. Implementations of the invention further provide a system and method to validate authorizations of a temporary or permanent legal guardian or authorized decision maker without a physical paper trail. Implementations of the invention additionally provide a system and method to utilize IoT (Internet of Things) devices to facilitate validation of authorized and unauthorized individuals as related to decisions made for another individual.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
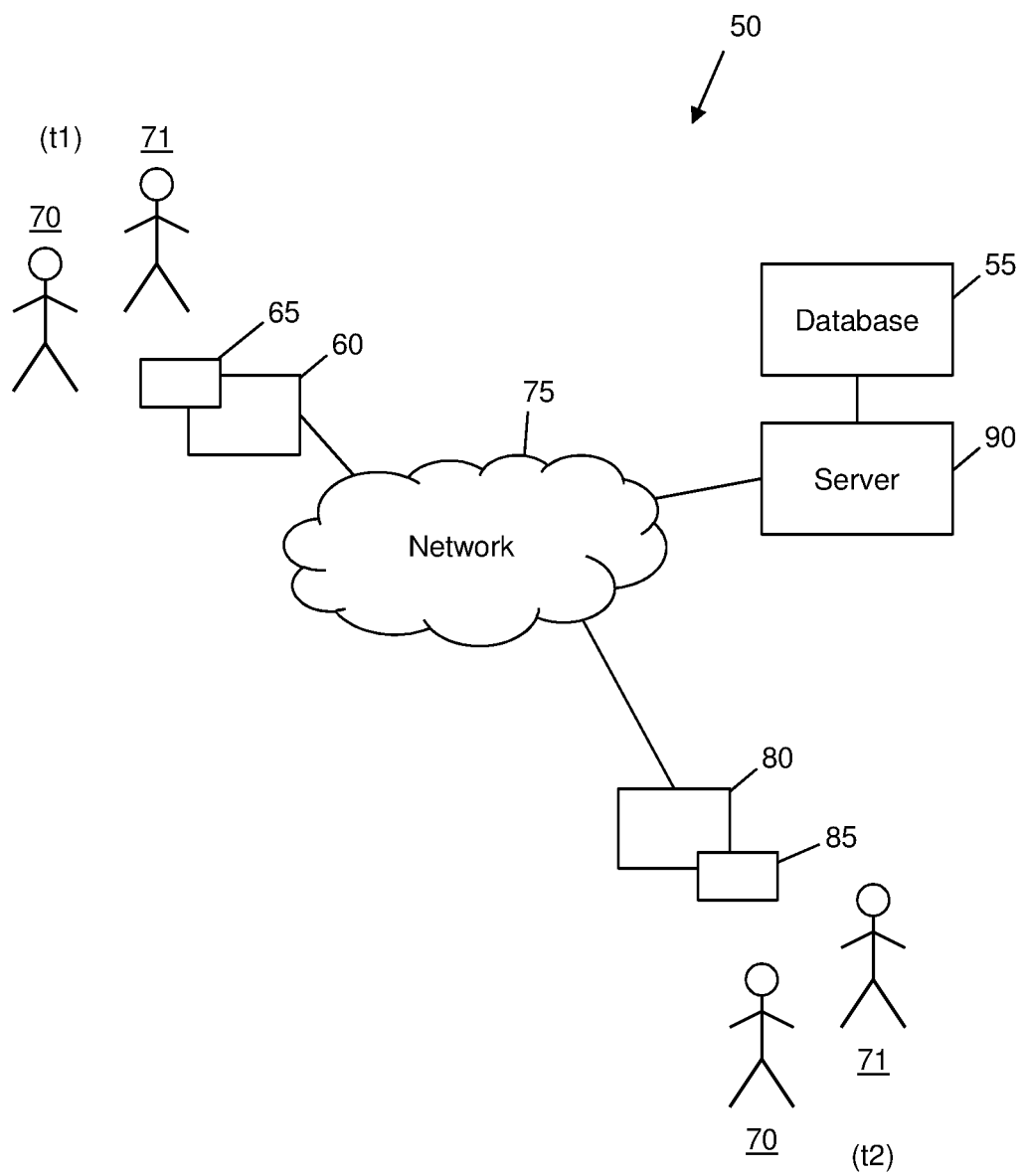
FIG. 2 shows a block diagram of an exemplary environment in accordance with aspects of the invention.

FIG. 2 depicts a block diagram of an illustrative environment 50 in accordance with aspects of the invention. The environment includes a secure database 55 that stores data defining guardian/ward relationships being tracked by the system. In embodiments, the secure database 55 comprises a blockchain, e.g., a distributed blockchain database. For example, the secure database 55 may comprise data storage on plural computer devices connected in a distributed network environment that function as a distributed ledger of the data. Implementations of the invention are not limited to a blockchain, however, and the secure database 55 may comprise, for example, a single computer device that stores and manages data in the manner described herein.

The environment 50 also includes a trusted entity device 60. In embodiments, the trusted entity device 60 is a computer device that is controlled by an entity that is entrusted with entering certain data into the secure database 55. The trusted entity may include, for example and without limitation, a state or federal administrative entity such as a Department of Health and Human Resources or a Division of Vital Records, a judicial entity such as a county court, state court, or federal court, or a trusted entity such as a hospital or post office. In embodiments, only a trusted entity has the ability to enter or alter certain data that is stored by the system, and other users of the system (e.g., the individuals identified by the data and end-users seeking validation) cannot alter the data that is entered by the trusted entity.

In embodiments, the trusted entity device 60 is a computer device such as a desktop computer, laptop computer, tablet computer, smartphone, etc., that comprises one or more elements of the computer system 12 of FIG. 1. In embodiments, the trusted entity device 60 includes or is operatively connected to a biometric data input device 65, such as a retina scanner, face scanner, fingerprint scanner, footprint scanner, etc. For example, the trusted entity device 60 may include a biometric data input device 65 in the form of a capacitive fingerprint sensor that is configured to detect a fingerprint of an individual and generate data that defines the detected fingerprint. In another example, the trusted entity device 60 may be operatively connected to (e.g., wired or wirelessly communicating with) a biometric data input device 65 in the form of a specialized camera (or group of cameras) that is configured to detect a face of an individual and generate data that defines the detected face. These examples are for illustration only and not intended to be limiting, and other types of conventional or later developed biometric data input device 65 may be used in implementations of the invention.

In accordance with aspects of the invention, the biometric data input device 65 is configured to capture biometric data of individuals including a guardian 70 and a ward 71, and to pass the biometric data (e.g., a respective fingerprint of each of the guardian 70 and the ward 71) to the trusted entity device 60. In embodiments, a user of the trusted entity device 60 enters data defining a relationship of the guardian 70 and the ward 71, and the trusted entity device 60 saves the biometric data and the data defining the relationship in the secure database 55. In aspects, the data defining the relationship includes, but is not limited to, data defining one or more authorizations based on the relationship. In aspects, the authorization defines an activity the guardian is authorized to perform with the ward or a decision the authorization is authorized to make on behalf of the ward. There may be plural different authorizations for a guardian 70 and ward 71 defined and stored in the database 55. In embodiments, the trusted entity device 60 communicates with the secure database 55 via a network 75, which may include one or more of a LAN, WAN, and the Internet. In this manner, the secure database 55 is populated with biometric data of the guardian 70, biometric data of the ward 71, and data defining a relationship between the guardian 70 and the ward 71.

Still referring to FIG. 2, the environment 50 includes a validation device 80 and an associated biometric data input device 85. In embodiments, the validation device 80 is a computer device that is controlled by a validating entity that wishes to validate the relationship between individuals. The validating entity may include, for example and without limitation, an entity at an international travel control point (e.g., at an airport or port) that wishes to validate the authority of the guardian 70 to travel with the ward 71. In another example, the validating entity may include an entity at a hospital (e.g., at an emergency room) that wishes to validate the authority of the guardian 70 to make medical decisions for the ward 71.

In embodiments, the validation device 80 is a computer device such as a desktop computer, laptop computer, tablet computer, smartphone, IoT device, etc., that comprises one or more elements of the computer system 12 of FIG. 1. In embodiments, the validation device 80 includes or is operatively connected to the biometric data input device 85, such as a retina scanner, face scanner, fingerprint scanner, footprint scanner, etc., e.g., similar to the biometric data input device 65 already described.

In accordance with aspects of the invention, the validation device 80 is configured to use the biometric data input device 85 to scan the biometric data of individuals, send the scanned biometric data to the database 55 (e.g., included in a request for validation), and receive from the database 55 the data defining the relationship between the individuals whose biometric data was scanned. In embodiments, the validation device 80 comprises an output device, such as a display screen, that outputs the data received from the database 55 in response to the scanned the biometric data of individuals.

For example, in an illustrative use case of an implementation of the invention, the guardian 70 and the ward 71 register with the system via the trusted entity device 60 at a first time (t1). Upon such registration, the trusted entity device 60 stores the biometric data of the guardian 70 and the ward 71, and also data defining the relationship between the guardian 70 and the ward 71, in a record in the database 55. At a second time (t2) after time t1, the guardian 70 and the ward 71 each scan their biometric data at the biometric data input device 85 in order to validate their relationship to the validating entity. The validation device 80 receives the scanned biometric data from the biometric data input device 85 and sends the scanned biometric data to the database 55, e.g., in a request for validation using an application program interface (API) call. In response to receiving the scanned biometric data from the validation device 80, the database 55 determines whether a record matches the scanned biometric data from the validation device 80, e.g., by comparing the scanned biometric data received in the request for validation to biometric data stored in records in the database 55. In the event that a record in the database 55 matches the scanned biometric data, then the database 55 accesses data in that record that defines a relationship between the individuals and returns that data to the validation device 80, e.g., by transmitting to the validation device 80 data defining an authorization based on the relationship. The validation device 80 outputs the data defining the relationship (e.g., data defining an authorization based on the relationship) via a visual display screen. For example, the validation device 80 may output text and/or a graphic via a visual display screen, wherein the text and/or graphic indicates that the guardian 70 is the parent of the ward 71 and that the parent is authorized to medical decisions on behalf of the ward. In this manner, a user of the validation device 80 may validate the relationship between the guardian 70 and the ward 71 by having the guardian 70 and the ward 71 each scan their biometric data at the biometric data input device 85.

In implementations, there are plural different trusted entity devices 60, each associated with a biometric data input device 65 and having the capability of providing data to the database 55 in the manner described herein. In this way, there may be plural different geographic locations that serve as trusted points for inputting data into the system. Also, there may be plural different validation devices 80, each associated with a biometric data input device 85 and having the capability of querying the database 55 in the manner described herein. In this way, validation may be performed at plural different geographic locations.

In an embodiment, the database 55 is part of, or operatively connected to, a server 90. In this embodiment, the server 90 receives the data from the trusted entity device 60 and writes the data to the database 55. In this embodiment, the server 90 receives the request from the validation device 80 (i.e., including the scanned biometric data of the two individuals), accesses the database 55 to determine if there is a record that matches the scanned biometric data of the two individuals, and returns the data defining the relationship in the event that such as record exists in the database 55. In this manner, the server 90 functions as an intermediary between plural different trusted entity devices 60 and the database 55, and also between plural different validation devices 80 and the database 55. In embodiments, the server 90 is configured to store a log of each request received from validation device 80, e.g., for reporting purposes.

In embodiments, the server 90 is a computer device comprising one or more elements of the computer system 12 of FIG. 1. In embodiments, the server 90 comprises at least one program module (e.g., program module 42 of FIG. 1) that is configured to perform one or more of the processes described herein, such as: receive biometric and relationship data from the trusted entity device 60 and store the data in a record in the database 55; receive a request from the validation device 80; accesses the database 55 to determine if there is a record that matches the scanned biometric data included in the request from the validation device 80; returns data defining the relationship in the event that such as record exists in the database 55; and record the request in a log. In this manner, reference in this description to sending/writing data to the database 55 refers to either one of: sending/writing data directly to the database 55, and sending/writing data to the server 90 which then sends/writes the data to the database 55. Similarly, reference in this description to receiving/obtaining data from the database 55 refers to either one of: receiving/obtaining data directly from the database 55, and receiving/obtaining data from the server 90 which has received/obtained the data from the database 55.

In accordance with aspects of the invention, the system is configured to permit a guardian to delegate authority to another person. In embodiments, the guardian is an individual defined by data entered by the trusted entity, and the system is configured to permit the guardian to add additional data to the system that defines a delegation of authority. For example, in the case where consent of two parents is required for traveling internationally with their child, one of the two parents may provide input to the system to delegate their authority (e.g., provide their consent) to the other one of the two parents. This aspect of the invention is illustrated in FIG. 3 as described herein.

Figure 3:
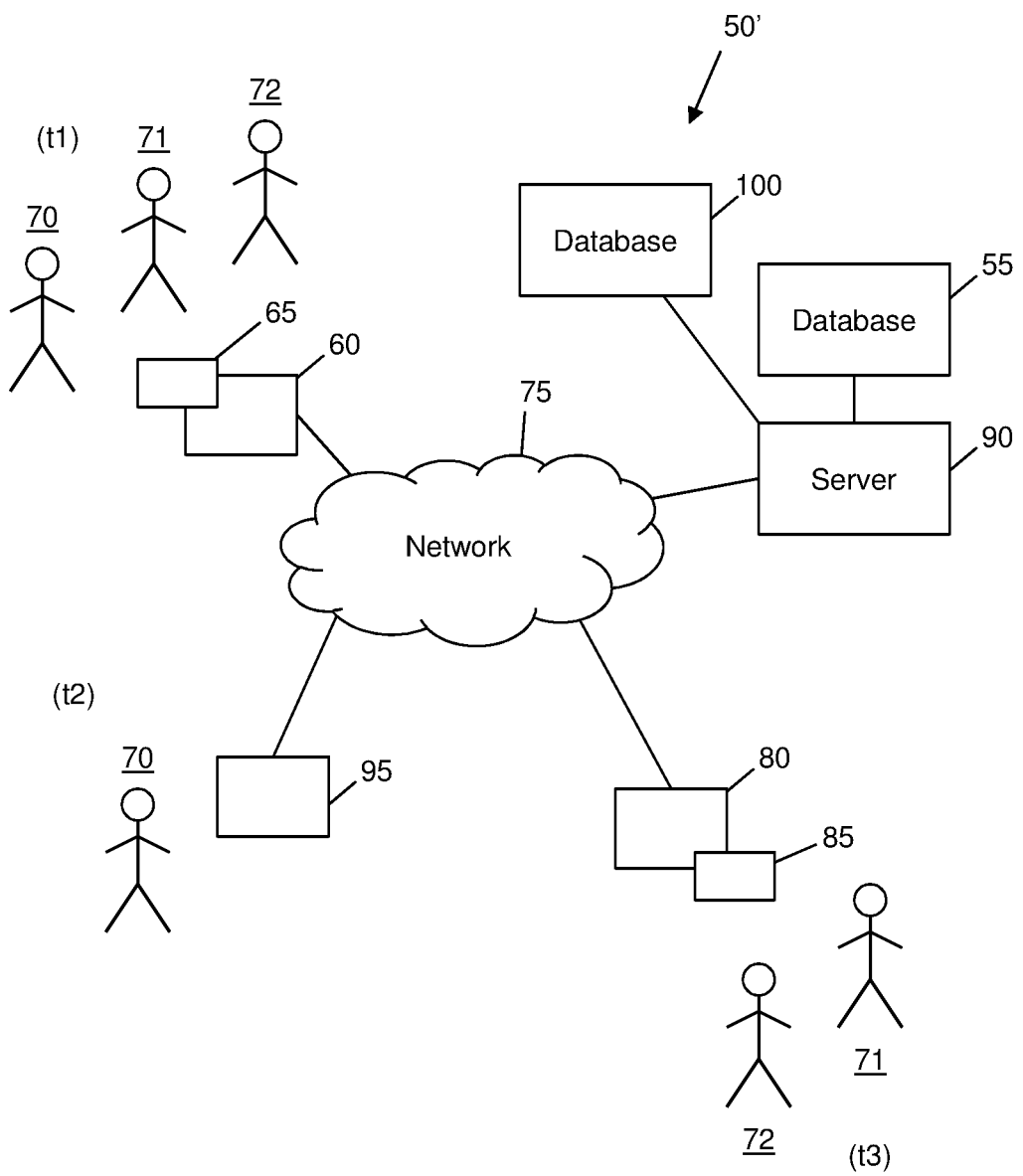
FIG. 3 shows a block diagram of an exemplary environment in accordance with aspects of the invention.

FIG. 3 depicts a block diagram of an illustrative environment 50' in accordance with aspects of the invention. The environment 50' includes many of the same elements as the environment 50, which are indicated by same reference numbers as used in FIG. 2. In this example, a first guardian 70, a second guardian 72, and a ward 71 register with the system via the trusted entity device 60 at a first time (t1), e.g., in a manner similar to that described with respect to FIG. 2. In this example, the first guardian 70 and the second guardian 72 are the parents of the ward 71. Upon registration as described herein, the trusted entity device 60 sends the biometric data of the first guardian 70, the second guardian 72, and the ward 71, as well as data defining the relationship amongst the three, to the database 55 where it is stored in a record.

Still referring to the example of FIG. 3, at a time t2 after time t1, the first guardian 70 uses their computer device 95 to provide input to the system to delegate authority that is defined by the data stored in the database 55. In embodiments, the computer device 95 is a user computer device such as a desktop computer, laptop computer, tablet computer, smartphone, etc., that comprises one or more elements of the computer system 12 of FIG. 1. In embodiments, the computer device 95 comprises a program module, such as an application (e.g., an "app") that provides an interface for the user (e.g., the first guardian 70 in this instance) to provide input to the system to delegate authority. In embodiments, the app requires the user to perform authentication, e.g., using biometric data obtained by a biometric data input device included in or operatively connected to the computer device 95. In embodiments, the computer device 95 sends the biometric data obtained from the user (e.g., the first guardian 70 in this instance) to the server 90, which compares the biometric data obtained from the user to biometric data in the database 55. After authenticating the user in this manner, the app on the computer device 95 permits the user to provide input to the system to delegate authority associated with a relation defined in the database 55. In this example, the first guardian 70 provides input indicating that they consent to the ward 71 traveling internationally with only the second guardian 72 for a specific date range. In aspects, the delegation is for a defined time (e.g., for a defined date range) and a defined activity (e.g., for traveling from country A to country B and back), which may be defined by the user providing the delegation.

In one embodiment, data defining the delegation (received from the computer device 95) is stored in the database 55 in the same record that defines the relationship between the first guardian 70, the second guardian 72, and the ward 71. In another embodiment, data defining the delegation (received from the computer device 95) is stored in a database 100 that is different than the database 55. In the latter embodiment, the database 55 may comprise a first blockchain that is only updated with data received from one of the trusted entity devices 60, and the database 100 may comprise a second blockchain that is updated with data received from the computer device 95 (e.g., after authentication at the computer device 95). In this manner, the second blockchain contains information about the individual (or product) that is the subject of a delegation by the guardian (e.g., the first guardian 70 in this example). In embodiments, the record in the first database 55 includes a link to the record in the second database 100. In aspects, the second blockchain includes a brick for each person and is broken down further for different authorizations that are given to others. For example, the first guardian 70 has a brick with information associated with the ward 71, and this brick has more detail information than is contained in the ward's biometrics, e.g., linked to the first blockchain. For each person that is given an authorization, there is a brick in the second blockchain defining the authorization and the person to whom this authorization is granted. In this manner, the two blockchain embodiment provides bi-directional authorization between multiple blockchains.

Still referring to the example of FIG. 3, at a time t3 after time t2, the second guardian 72 and the ward 71 are travelling internationally. In this example, the second guardian 72 and the ward 71 each scan their biometric data at the biometric data input device 85, e.g., at an international travel control point at an airport. In this example, the validation device 80 sends the biometric data to the server 90 for validation. In response to receiving the request for validation from the validation device 80, the server 90 searches the database 55 (and optionally the database 100, e.g., via the link in the first database 55) for authorizations associated with the biometric data received in the request for validation. In this example, the server 90 determines from the database 55 (and optionally the database 100) that the second guardian 72 is a parent of the ward 71, that the first guardian 70 is also a parent of the ward 71. In this example, the server 90 also determines from the database 100 (e.g., via a link from the record in the database 55) that the first guardian 70 and has consented to the ward 71 traveling internationally with the second guardian 72. In response to determining the relationships and authorizations defined for the biometric data received in the request for validation, the server 90 returns data to the validation device 80, where the data is output by the validation device 80 such that a user of the validation device 80 is informed of the relationships and authorizations defined for the biometric data received in the request for validation. The output may include any retrieved conditions of the authorization, such as for a defined time (e.g., for a defined date range) and/or for a defined activity (e.g., for traveling from country A to country B and back).

In one implementation of the use case illustrated in FIG. 3, the first guardian 70 provides their input to the computer device 95 at a time t2 that is well in advance of time t3. However, aspects of the invention are not limited to this example. For example, in another implementation of the use case illustrated in FIG. 3, the first guardian 70 provides their input to the computer device 95 after the second guardian 72 and the ward 71 scan their biometric data at the validation device 80. In this example, the first guardian 70 has forgotten to enter their authorization in the system, such that when the second guardian 72 and the ward 71 scan their biometric data at the validation device 80, the system returns an output that the ward 71 may not travel alone with the second guardian 72 since there is no authorization in the system from the first guardian 70. In this example, based upon receiving the output from the validation device 80, the second guardian 72 contacts the first guardian 70 (e.g., by telephone, text message, email, etc.) to remind the first guardian 70 to enter their consent. While the second guardian 72 and the ward 71 are waiting at the validation device 80, the first guardian 70 uses the computer device 95 to enter their consent to the system, after which the second guardian 72 and the ward 71 re-scan their biometric data at the validation device 80 and receive approval based on the consent of the first guardian 70 that is now in the system. In this manner, aspects of the invention may be used to provide real-time (or on demand) consent via the system.

Figure 4:
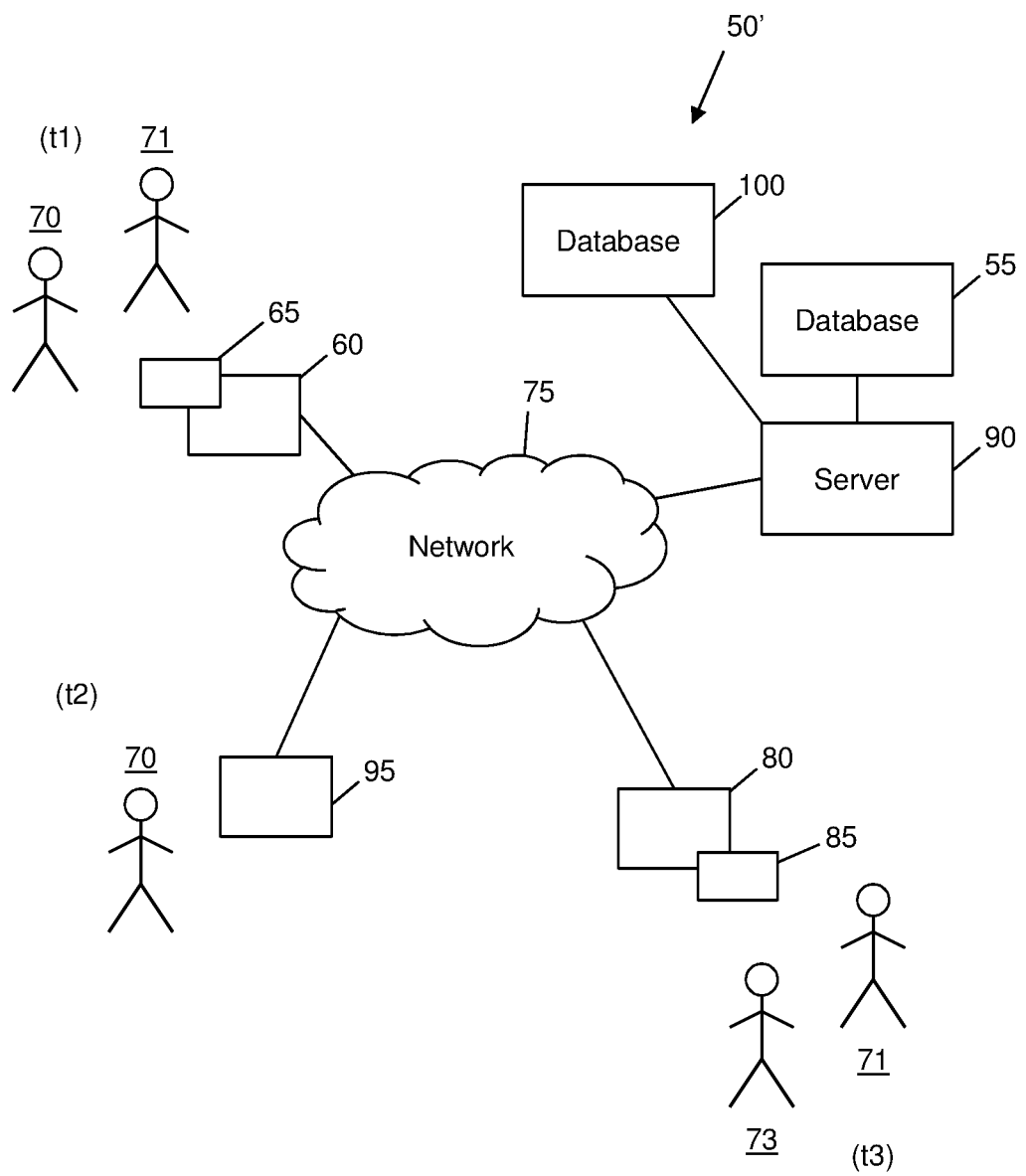
FIG. 4 shows a block diagram of an exemplary environment in accordance with aspects of the invention.

FIG. 4 shows a block diagram of an exemplary use case of the environment 50' in which the guardian 70 uses the computer device 95 to delegate authorization to another individual 73. In this example, upon registration at time t1 as described herein, the trusted entity device 60 sends the biometric data of the guardian 70 and the ward 71, as well as data defining the relationship amongst the two, to the database 55 where it is stored in a record. At time t2, the guardian 70 uses the computer device 95 to delegate an authorization regarding the ward to another individual 73. The other individual may be, for example, a family friend or a grandparent, and the delegated authorization may include, for example, authorization to take the ward on an overnight camping trip. In this example, the authorization is saved in a record in the second database 100 along with data that defines an identity of the individual 73. In embodiments, this record in the second database 100 is linked to the record of the guardian 70 and the ward 71 in the first database. In this manner, when the ward 71 scans their biometric data at the biometric data input device 85 at time t3, the validation device 80 send the biometric data of the ward 71 to the server 90, and the server 90 searches the database 55 for a record that matches the scanned biometric data of the ward 71.

Still referring to the use case illustrated in FIG. 4, in this example the record of the guardian 70 and the ward 71 in the database 55 is linked to a record in the database 100 that defines the authorization granted by the guardian 70 to the individual 73. In response to accessing this information in the database 55 and the database 100, the server 90 sends data to the validation device 80 defining the authorization that has been delegated to the individual 73. The data sent by the server 90 to the validation device 80 may also include identifying information about the individual 73, such as a driver's license number, for example. In response to receiving this data from the server 90, the validation device 80 generates an output (e.g., via a display) indicating the authorization granted by the guardian 70 to the individual 73. The output may include the identifying information about the individual 73.

With continued reference to FIG. 4, in an alternative embodiment, the individual 73 is required to register with the system before authorization is displayed at the validation device 80. In this embodiment, the individual 73 registers their biometric data with the system at a trusted entity device 60, e.g., in the manner described herein. Then, when the guardian 70 uses the computer device 95 to grant an authorization to the individual 73, the system stores data defining the authorization as well as the biometric data of the individual 73 in a record in the second database 100, the record being linked to the record of the guardian 70 and the ward 71 in the first database 55. In this manner, when the ward 71 and the individual 73 each scan their biometric data at the validation device 80, the system determines the authorization stored in the second database 100 and outputs data indicating the authorization at the validation device 80.

Aspects of the invention are not limited to the examples and use cases described with respect to FIGS. 2-4, and other uses will be apparent to those of ordinary skill in the art. For example, and without limitation, implementations of the invention may be used in the following manner: one or both parents traveling internationally with their child; a parent providing authorization for another individual to take a child on a designated activity (e.g., field trip, etc.); an elderly person providing authorization for another person to make designated financial and/or medical decisions on behalf of the elderly person; a parent providing authorization to a hospital to perform designated medical actions with the parent's child when the parent is away from the hospital.

Aspects of the invention provide a technical solution to the problem of validating those activities that are approved by a guardian versus those that are not approved by the guardian. In embodiments, the technical solution is implemented using particular devices such as biometric scanning devices and a secure database (which may comprise one or more blockchains), in which biometric data of the individuals and data defining a relationship between the individuals is stored in a record in the secure database, and in which the data is accessible based on scanning the biometric data of the individuals at a subsequent time. Aspects of the invention also improve the technical field of validation, in particular computer-based validation those authorized activities that are approved by a guardian versus those that are not approved by the guardian, by implementing such validation using biometric data and a secure database such as a blockchain.

Figure 5:
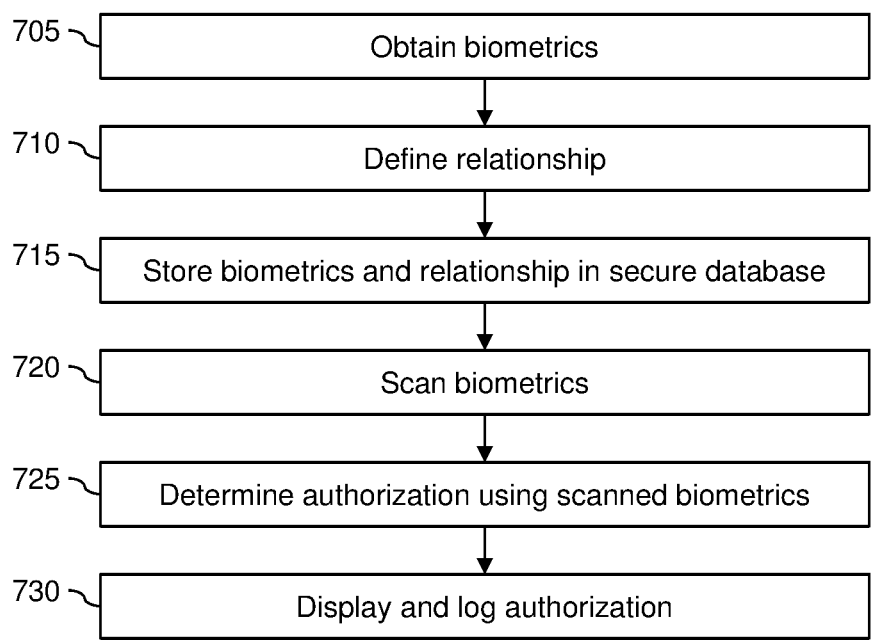
FIG. 5 shows a flowchart of an exemplary method in accordance with aspects of the invention.

FIG. 5 shows a flowchart of an exemplary method in accordance with aspects of the present invention. Steps of the method may be carried out in the environments of FIGS. 2-4 and are described with reference to elements depicted in FIGS. 2-4.

At step 705, the system obtains biometric data of a guardian and a ward or an object. In an embodiment, and as described with respect to FIG. 2, step 705 includes scanning the biometric data of the guardian 70 and ward 71 at the biometric data input device 65.

At step 710, the system obtains information defining a relationship between the guardian and the ward or the guardian and the object. In an embodiment, and as described with respect to FIG. 2, step 710 includes a trusted entity entering data at the trusted entity device 60. In an embodiment, the data includes data defining a relationship between the guardian and the ward.

At step 715, the system stores the biometric data (from step 705) and the relationship data (from step 710) at a secure database. In an embodiment, and as described with respect to FIG. 2, step 715 includes the trusted entity device 60 transmitting the data to the database 55, and the database 55 storing the data in a record. In another embodiment, step 715 includes the trusted entity device 60 transmitting the data to the server 90, and the server 90 storing the data in a record in the database 55.

At step 720, the system scans biometric data as part of a validation process. In an embodiment, and as described with respect to FIG. 2, step 705 includes scanning the biometric data of the guardian 70 and the ward 71 at the biometric data input device 85.

At step 725, the system determines authorizations based on the data obtained at step 720. In an embodiment, and as described with respect to FIG. 2, step 725 includes the validation device 80 transmitting a validation request including the scanned biometric data to the database 55, the database 55 determining authorizations based on the biometric data, and the database 55 returning the determined authorizations to the validation device 80. Steps 715 and 725 may also be implemented with the server 90 as the intermediary as described herein.

At step 730, the system displays the authorizations obtained at step 725. In an embodiment, and as described with respect to FIG. 2, step 730 includes the validation device 80 displaying the authorizations obtained from the database 55. Step 730 may also include the system (e.g., the server 90) updating a log with data defining the request that was the subject of steps 720 and 725.

Figure 6:
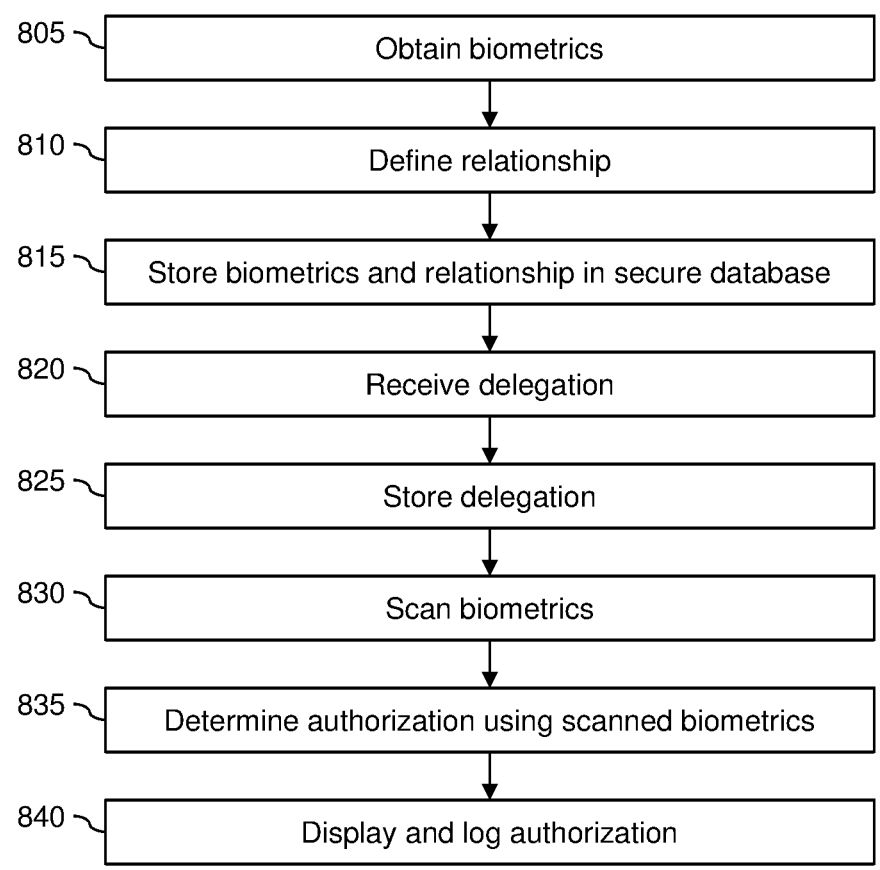
FIG. 6 shows a flowchart of an exemplary method in accordance with aspects of the invention.

FIG. 6 shows a flowchart of an exemplary method in accordance with aspects of the present invention. Steps of the method may be carried out in the environments of FIGS. 2-4 and are described with reference to elements depicted in FIGS. 2-4. Steps 805, 810, and 815 are performed in the same manner as steps 705, 710, and 715, respectively.

At step 820, the system receives a delegation. In embodiments, and as described with respect to FIGS. 3-4, step 820 includes the guardian 70 using the computer device 95 to enter a delegation. In embodiments, the delegation is a subset of the authority defined in the relationship at step 810. In an embodiment, the delegation includes an indication of one or more activities that may be performed with the ward 71 and/or one or more decisions that may be made on behalf of the ward 71. In an embodiment, the delegation includes an identification of an individual 73 that is authorized to perform delegated activities with the ward 71. In an embodiment, the delegation includes an indication of a date range of the permission.

At step 825, the system stores data defining the delegation received at step 820. In an embodiment, and as described with respect to FIGS. 3-4, step 825 includes the computer device 95 sending data defining the delegation to the database 55, and the database 55 storing data defining the delegation in the record associated with the guardian 70. In an embodiment, and as described with respect to FIGS. 3-4, step 825 includes the computer device 95 sending data defining the delegation to the server 90, and the server 90 storing the data in a second database 100 with a link between the record in the first database 55 and the record in the second database 100.

At step 830, the system scans biometrics. At step 835, the system determines authorizations based on the data obtained at step 830. At step 840, the system displays the authorizations determined at step 835. In embodiments, steps 830, 835, and 840 are performed in a manner similar to steps 720, 725, and 730. In embodiments, step 835 includes determining delegations defined at step 825, and step 840 includes displaying the delegations determined at step 835.

In this manner, implementations of the invention are usable to provide a computer implemented system and method for determining authorities from a guardian or authorized proxy, the method composed of; identifying an individual that has a person authorized to for certain actions; providing a secured way of authorizing and protecting individuals into the system; providing an interface for registered users to validate the authorities requested; providing a secure way of identifying permanent guardians, temporary guardians and the people that they have responsibility for; and notifying guardians of changed authority when there is shared custody. The method may further include capturing biometric information about authorized individuals and the individual for whom they have delegated authorities. The method may further include authorized users whom can enter the original information (e.g. courts, hospitals, municipalities—similar to those authorized to issue a passport). The method may further include allowing the primary guardian to delegate authorities. The method may further include only allowing authorization changes after validating biometric matches. The method may further include authorizing all or a subset of authorities to an individual. The method may further include providing temporal limits on the authority. The method may further include checking biometric data before retrieving results from an interface.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computer device, biometric data scanned from a guardian and biometric data scanned from a ward;
   receiving, by the computer device, data defining a relationship between the guardian and the ward;
   storing, by the computer device, the biometric data scanned from the guardian, the biometric data scanned from the ward, and the data defining the relationship in a record in a secure database;
   receiving, by the computer device, a request for validation including scanned biometric data;
   determining, by the computer device, the scanned biometric data matches the record in the secure database; and
   transmitting, by the computer device and in response to the determining, data defining an authorization based on the relationship,
   wherein the biometric data scanned from the guardian, the biometric data scanned from the ward, and the data defining the relationship are received by the computer device from a trusted entity device that is a different device than the computer device;
   the request for validation is received by the computer device from a validation device that is a different device than both the computer device and the trusted entity device; and
   the data defining the authorization based on the relationship is transmitted to the validation device.

2. The method of claim 1, wherein:
   the biometric data scanned from the guardian, the biometric data scanned from the ward, and the data defining the relationship are received by the computer device from the trusted entity device at a first time;
   the request for validation is received by the computer device from the validation device at a second time after the first time; and
   the request for validation includes biometric data scanned from two individuals at the validation device.

3. The method of claim 1, wherein the secure database comprises a blockchain.

4. The method of claim 1, further comprising:
   receiving, by the computer device, an indication of a delegation of authority; and
   storing, by the computer device, data defining the delegation of authority,
   wherein the data defining the authorization based on the relationship comprises data defining the delegation of authority.

5. The method of claim 4, wherein the delegation of authority comprises:
   an indication of an individual other than the guardian and the ward; and
   an indication of an activity the individual is authorized to perform with the ward or a decision the individual is authorized to make on behalf of the ward.

6. The method of claim 5, wherein the activity or the decision is a subset of activities or decisions defined by the relationship between the guardian and the ward.

7. The method of claim 5, wherein the delegation of authority comprises an indication of a time period for which the delegation of authority is authorized.

8. The method of claim 5, wherein:
   the secure database storing the biometric data scanned from the guardian, the biometric data scanned from the ward, and the data defining the relationship is a first database; and
   the data defining the delegation of authority is stored in a second secure database different than the first database.

9. The method of claim 8, wherein:
   the first database is a first blockchain; and
   the second database is a second blockchain.

10. A computer program product, the computer program product comprising a non-transitory computer readable storage medium having program instructions embodied therewith, the program instructions executable by a computing device to cause the computing device to:
    receive biometric data scanned from a guardian and biometric data scanned from a ward;
    receive data defining a relationship between the guardian and the ward;
    store the biometric data scanned from the guardian, the biometric data scanned from the ward, and the data defining the relationship in a record in a secure database;
    receive a request for validation including scanned biometric data;
    determine the scanned biometric data matches the record in the secure database; and
    transmit data defining an authorization based on the relationship;
    wherein the secure database storing the biometric data scanned from the guardian, the biometric data scanned from the ward, and the data defining the relationship is a first database; and
    data defining a delegation of authority is stored in a second secure database different than the first database.

11. The computer program product of claim 10, wherein:
    the biometric data scanned from the guardian, the biometric data scanned from the ward, and the data defining the relationship are received from a trusted entity device;
    the request for validation is received from a validation device; and the data defining the authorization based on the relationship is transmitted to the validation device.

12. The computer program product of claim 10, wherein the secure database comprises a blockchain.

13. The computer program product of claim 10, wherein the program instructions cause the computing device to:
   receive an indication of the delegation of authority; and
   store the data defining the delegation of authority,
   wherein the data defining the authorization based on the relationship comprises the data defining the delegation of authority.

14. The computer program product of claim 13, wherein the delegation of authority comprises:
   an indication of an individual other than the guardian and the ward; and
   an indication of an activity the individual is authorized to perform with the ward or a decision the individual is authorized to make on behalf of the ward.

15. The computer program product of claim 14, wherein the activity or the decision is a subset of activities or decisions defined by the relationship between the guardian and the ward.

16. The computer program product of claim 14, wherein the delegation of authority comprises an indication of a time period for which the delegation of authority is authorized.

17. A system comprising:
   a processor, a computer readable memory, and a computer readable storage medium;
   program instructions to receive, from a trusted entity device, biometric data scanned from a guardian and biometric data scanned from a ward;
   program instructions to receive, from the trusted entity device, data defining a relationship between the guardian and the ward;
   program instructions to store the biometric data scanned from the guardian, the biometric data scanned from the ward, and the data defining the relationship in a record in a first secure database;
   program instructions to receive, from a computer device other than the trusted entity device, a delegation of authority associated with the relationship between the guardian and the ward;
   program instructions to store data defining the delegation of authority in record in a second secure database linked to the record in the first secure database;
   program instructions to receive, from a validation device, a request for validation including scanned biometric data;
   program instructions to determine the scanned biometric data matches the record in the first secure database; and
   program instructions to transmit, to the validation device and in response to the determining, data defining the delegation of authority associated with the relationship,
   wherein the program instructions are stored on the computer readable storage medium for execution by the processor via the computer readable memory.

18. The system of claim 17, wherein the delegation of authority comprises:
   an indication of an individual other than the guardian and the ward; and
   an indication of an activity the individual is authorized to perform with the ward or a decision the individual is authorized to make on behalf of the ward.

19. The system of claim 18, wherein:
   the activity or the decision is a subset of activities or decisions defined by the relationship between the guardian and the ward; and
   the delegation of authority comprises an indication of a time period for which the delegation of authority is authorized.

* * * * *